United States Patent Office 3,751,388
Patented Aug. 7, 1973

3,751,388
MODIFIED POLYPHENYLENE OXIDE COMPOSITION CONTAINING A FATTY ACID BISAMIDE EITHER ALONE OR IN ADMIXTURE WITH A METAL SALT OF A FATTY ACID
Minoru Tabana, Suita, Takuzo Okumura, Takatsuki, and Kiyoshi Yasuno, Ibaragi, Japan, assignors to Sumitomo Chemical Company, Ltd., Higashi-ku, Osaka, Japan
No Drawing. Continuation-in-part of application Ser. No. 115,799, Feb. 16, 1971. This application Feb. 14, 1972, Ser. No. 226,268
Claims priority, application Japan, Feb. 19, 1970, 45/14,585
Int. Cl. C08g 43/02
U.S. Cl. 260—23 S                    11 Claims

ABSTRACT OF THE DISCLOSURE

A modified polyphenylene oxide composition with improved processability comprising a modified polyphenylene oxide, which is prepared by polymerizing at least one unsubstituted or substituted styrene compound in the presence of a polyphenylene oxide with or without a rubbery polymer, and an additive selected from the group consisting of a fatty acid bisamide and a mixture of the fatty acid bisamide and a metallic salt of a fatty acid. Said composition has a low molding temperature and an improved moldability. The mold releasing property and the surface appearance of the molded articles are also satisfactory.

---

This is a continuation-in-part application of application Ser. No. 115,799, filed Feb. 16, 1971 and now abandoned.

The present invention relates to a modified polyphenylene oxide composition. More particularly, the present invention relates to a modified polyphenylene oxide composition comprising a modified polyphenylene oxide and an additive selected from the group consisting of a fatty acid bisamide and a mixture of the fatty acid bisamide and a metallic salt of a fatty acid.

The modified polyphenylene oxide can be prepared by polymerizing at least one unsubstituted or substituted styrene compound in a dispersed state in the presence of a polyphenylene oxide with or without a rubbery polymer in an aqueous medium containing a solvent for the polyphenylene oxide, a surface active agent and a radical initiator, for example, according to the process described in Japanese patent applications No. 56,501/68 and No. 525/69, and described in corresponding U.S. application Ser. No. 845,006, filed July 25, 1969, now abandoned, and Ser. No. 887,418, filed Dec. 22, 1969, now abandoned. The modified polyphenylene oxide can also be prepared, for example, by the processes described in co-pending application Ser. No. 174,138, filed Aug. 23, 1971, now U.S. 3,700,630, and in co-pending application Ser. No. 218,591 filed on Jan. 17, 1972 in the names of Nakashio, Maruta, Hayatsu and Kono, which applications individually are continuations-in-part of the aforesaid U.S. applications, respectively.

They are characterized by very good processability and high impact strength, while retaining the inherently good heat distortion resistance of polyphenylene oxide; and they have therefore proved to be industrially useful thermoplastic resins, and have recently found wide applications for making electrical appliance parts, mechanical parts and structural elements.

However, it is known that polyphenylene oxide is unstable to heat and light, which turns it brown and brittle under the influence of heat and light exposure. The styrene polymer and, more especially, the rubbery polymer portion of the modified polyphenylene oxide can also have poor thermal and light stabilities.

Therefore, in the molding of modified polyphenylene oxide, it is of great value for the development of uses of the modified polyphenylene oxide to lower its molding temperature as far as possible, because the lowering of molding temperature results in not only improvement of the moldability but also suppression of thermal deterioration of the modified polyphenylene oxide during processing to the minimum to assure excellent physical properties of the molded articles.

As a result of various investigations, the present inventors have found a novel fact that when a metallic salt of fatty acids and a bisamide of fatty acids shown below are added to the modified polyphenylene oxide, these components show a desirable compatibility resulting in lowering of the molding temperature of the modified polyphenylene oxide as well as improvement in the mold releasing property and hence in the surface appearance of the molded articles. Based on said finding the present invention is accomplished.

That is, the present invention relates to a modified polyphenylene oxide composition comprising a modified polyphenylene oxide and an additive selected from the group consisting of a fatty acid bisamide having the general formula:

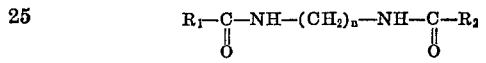

wherein $R_1$ and $R_2$ each is an alaphatic hydrocarbon radical having 11 to 21 carbon atoms and $n$ is an integer of from 1 to 4, and a mixture of the fatty acid bisamide and a metallic salt of a fatty acid having the general formula:

wherein R is an aliphatic hydrocarbon radical having 11 to 21 carbon atoms, M is a metallic atom selected from the group consisting of Ca, Mg, Ba, Zn and Pb, and $n$ is an integer corresponding to the valency of each of said metallic atoms, the fatty acid bisamide being present in an amount of 0.1 to 10% by weight, and the metallic salt of the fatty acid being present in an amount of 0.1 to 5% by weight, based on the weight of the modified polyphenylene oxide.

Polyphenylene oxides usable to prepare the modified polyphenylene oxide have a unit structure represented by the formula:

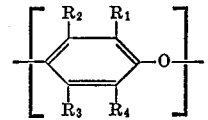

(I)

wherein $R_1$, $R_2$, $R_3$ and $R_4$ are a hydrogen atom, a halogen atom, a hydrocarbon group, a substituted hydrocarbon group, a cyano group, an amino group, a substituted amino group, a hydrocarbonoxy group, a substituted hydrocarbonoxy group or a nitro group.

Concretely, $R_1$, $R_2$, $R_3$ and $R_4$ are any of hydrogen, chlorine, bromine and iodine atoms, and methyl, ethyl, propyl, allyl, phenyl, benzyl, methylbenzyl, chloromethyl, bromomethyl, cyanoethyl, cyano, amino, methoxy, ethoxy, choromethoxy, cyanoethoxy, phenoxy, p-chlorophenoxy, and nitro groups.

Concrete examples of the polyphenylene oxides include
poly-2,6-dimethyl-1,4-phenylene oxide,
poly-2,6-diethyl-1,4-phenylene oxide,
poly-2,6-dipropyl-1,4-phenylene oixde,
poly-2-methyl-6-allyl-1,4-phenylene oxide,
poly-2,6-dimethoxy-1,4-phenylene oxide,
poly-2,6-dichloromethyl-1,4-phenylene oxide,
poly-2,6-dibromomethyl-1,4-phenylene oxide, poly-2,6-ditolyl-1,4-phenylene oxide,
poly-2,6-dichloro-1,4-phenylene oxide,
poly-2,5-dimethyl-1,4-phenylene oxide, and
poly-2,6-diphenyl-1,4-phenylene oxide.

The unsubstituted or substituted styrene compounds employed to prepare the modified polyphenylene oxide are represented by the formula:

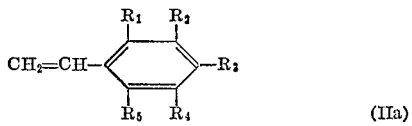

(IIa)

or

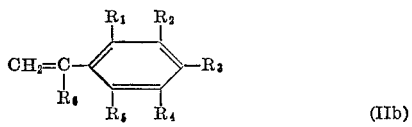

(IIb)

wherein $R_1$, $R_2$, $R_3$, $R_4$ and $R_5$ are a hydrogen atom, a halogen atom, a cyano group, an amino group, a substituted amino group, a hydroxy group, a carboxyl group, a hydrocarbon group, a substituted hydrocarbon group, a hydrocarbonoxy group or a substituted hydrocarbonoxy group; and $R_6$ is a hydrocarbon group.

The compounds represented by the Formula IIa may be used either alone or in combination with the compounds represented by the Formula IIb.

Concretely, $R_1$, $R_2$, $R_3$, $R_4$ and $R_5$ are any of hydrogen, chlorine, bromine and iodine atoms, hydroxy, carboxyl, methyl, ethyl, propyl, allyl, phenyl, benzyl, methylbenzyl, chloromethyl, bromomethyl, cyanoethyl, cyano, nitro, amino, methoxy, ethoxy, chloromethoxy, phenoxy, and p-chlorophenoxy groups; and $R_6$ is a methyl group.

Concrete examples of the styrene compounds include styrene, 2,4-dichlorostyrene, o-hydroxy styrene, p-carboxyl styrene, p-nitrostyrene, p-methoxystyrene, p-methylstyrene, p-phenylstyrene, p-acetoxystyrene, p-aminostyrene, m-cyanostyrene, o-hydroxystyrene, p-hydroxystyrene, o-divinylbenzene, p-divinylbenzene, α-methylstyrene, p-methoxy-α-methylstyrene, p-methyl-α-methylstyrene, m-methyl-α-methylstyrene, o-methyl-α-methylstyrene, and 1,1-diphenylethylene.

These styrene compounds may be used in any amount. However, for the purpose of modification of polyphenylene oxides, they are desirably used in an amount of 0.3–10 parts by weight per part by weight of the polyphenylene oxides. Further, the styrene compounds represented by the Formula IIb are preferably used in an amount of less than 40% by weight based on the total styrene amount.

Examples of rubbery polymers usable to prepare the modified polyphenylene oxide include polybutadiene, polyisoprene (including natural rubber), polychloroprene, butadiene-styrene copolymer, butadiene-styrene block copolymer, polybutadiene-styrene graft copolymer, polyisoprene-styrene graft copolymer, isoprene-styrene copolymer, poly(butadiene-acrylonitrile)-styrene graft copolymer, butadiene-acrylonitrile copolymer, poly(butadiene-styrene-α-methylstyrene graft copolymer, poly(butadiene-styrene)-methyl methacrylate graft copolymer, poly(butadiene-styrene)-styrene graft copolymer, poly(butadiene-styrene)-styrene-acrylonitrile graft copolymer, polychloroprene-styrene graft copolymer, polychloroprene-styrene graft copolymer, polychloroprene-styrene graft copolymer and poly(butadiene-acrylonitrile)-styrene graft copolymer. These rubbery polymers are used in an amount of 0.01–2 parts by weight, preferbaly 0.01–1 part by weight, per part by weight of the polyphenylene oxides.

Acid amides have been conventionally used as a lubricant for thermoplastic resins. However, all of the acid amides heretofore used as lubricants are not useful for the modified polyphenylene oxide. Among the acid amides, fatty acid bisamides are only useful. For instance, when added to modified polyphenylene oxide, fatty acid monoamides e.g. stearamide, oleamide, lauramide, etc. show their effectiveness in lowering the molding temperature of the former while causing deterioration in physical properties, particularly in impact strength, of the molded articles.

The fatty acid bisamides used in the present invention are effective not only in lowering the molding temperature, but also improving the impact resistance of the modified polyphenylene oxide. This is an industrially very useful and a novel finding.

In the present invention a metallic salt of fatty acid is used together with the fatty acid bisamide to enhance the effectiveness of the latter.

The examples of the fatty acid bisamides include methylenebisamides and ethylenebisamides of lauric acid, tridecanoic acid, myristic acid, palmitic acid, margaric acid, stearic acid, nonadecanoic acid, arachic acid, behenic acid, arachidonic acid, oleic acid, linolenic acid, parinaric acid, petroselic acid, vaccenic acid, elaidic acid, gadoleic acid, erucic acid, linolic acid, linoelaidic acid, etc. Examples of the metallic salts of fatty acids include Ca, Mg, Ba, Zn, or Pb salts of lauric acid, tridecanoic acid, myristic acid, palmitic acid, margaric acid, stearic acid, nonadecanoic acid, arachic acid, behenic acid, arachidonic acid, oleic acid, linolenic acid, parinaric acid, petroselic acid, vaccenic acid, elaidic acid, gadoleic acid, erucic acid, linolic acid, linoelaidic acid, etc.

The amount of fatty acid bisamide and of fatty acid metallic salt to be added in the present invention are 0.1 to 10% by weight, preferably 0.5 to 7% by weight and 0.1 to 5% by weight, preferably 0.5 to 4% by weight, respectively, on the basis of the modified polyphenylene oxide. When these are used in smaller amounts the improvement of moldability is difficult to attain to the full extent, while when used in larger amounts the physical properties of the molded article tend to deteriorate.

The manner of adding said additives of the present invention to the modified polyphenylene oxide is not critical. Hence, any ordinary mixing methods used in the industry may be employed. For example, the additives of the present invention can be added to a modified polyphenylene oxide powder, mixed in a Henschel-type mixer, and then milled by means of an extruder, a roller-mill, or the like. Alternatively, the additives of the present invention can be added to a solution of the modified polyphenylene oxide in a suitable solvent, mixed, and then the modified polyphenylene oxide composition with improved moldability can be recovered from the solution. Furthermore, the modified polyphenylene oxide composition with improved moldability can be directly obtained by adding the additives of the present invention to the polymerization mixture in the step of polymerizing a styrene compound in the presence of a polyphenylene oxide with or without a rubbery polymer to obtain the modified polyphenylene oxide.

The addition of stabilizers, pigments, fillers, etc., in such amounts as are used ordinarily in the industry to the composition of the present invention will cause no trouble in the present invention.

The invention is illustrated below by referring to examples which are merely illustrative, because many modifications are possible within the scope of the invention. In examples, the melt flow rate was measured at 250° C. under the load of 10 kg., according to the method of ASTM D-1238, and the impact strength is shown in terms of Izod impact strength measured at 20° C. according to the method of ASTM D-256. The softening temperature is shown in terms of Vicat softening point corresponding to the temperature at which the specified needle penetration of 1 mm. occurs, according to the method of ASTM D-1525.

EXAMPLES 1 AND 2

Various compounds as shown in Table 1 were added to a modified polyphenylene oxide powder having an intrinsic viscosity of 0.67 dl./g. (Example 1) or 0.69 dl./g.

(Example 2) (as measured in chloroform at 25° C.) and containing 56% by weight of 2,6-dimethyl-1,4-phenylene oxide units, 39% by weight of styrene units, and 5.0% by weight of butadiene units. Each mixture was milled in a 20 mm. φ extruder-type plastograph (made by Brabender Co.) adjusted to a cylinder temperature of 260° C., at a screw revolution speed of 30 r.p.m., and extruded, the milling torque having been measured at the same time. The compositions thus prepared were compression molded at 250° C. for 10 minutes to obtain a sheet, 3 mm. in thickness. Test specimens were prepared from the sheets according to the standard specifications, and tested for physical properties. The results obtained are as shown in Table 1.

TABLE 1

| Additive | | Milling torque of extrusion, kg.m. | Output rate of extrusion, g./hr. | Physical properties of compression molded sheets | | |
|---|---|---|---|---|---|---|
| Compound | Amount, phr. | | | Melt flow rate, g./10 min. | Vicat softening point, °C. | Izod impact strength, kg. cm./cm. |
| Example 1.... N,N'-distearoyl ethylene diamine...... | | 2,400 | 972 | 1.07 | 148.7 | 17.1 |
| Control...... None.................................... | | 2,600 | 960 | 0.77 | 152.5 | 14.3 |
| Example 2.... {N,N'-distearoyl ethylene diamine...... Zinc stearate........................... | 2 1 | 1,350 | .......... | 1.70 | 144.0 | 14.0 |
| Control...... None.................................... | | 2,350 | 848 | 0.96 | 149.8 | 10.0 |

As is clear from the results of Examples 1 and 2, in case where a mixture of a metallic salt of a fatty acid and a fatty acid bisamide is used, the effect for improving a processability is larger than the case where a fatty acid bisamide is used alone.

EXAMPLES 3 TO 5

In a manner similar to that in Examples 1 and 2, various compounds as shown in Table 2 were added to the modified polyphenylene oxide having an intrinsic viscosity of 0.69 dl./g. (as measured in chloroform at 25° C.). Each mixture was extruded from a 50 mm. φ extruder (made by Tanabe Plastic Co.) adjusted to a cylinder temperature of 260° C., at a screw revolution speed of 40 r.p.m., and pelletized. Each composition thus obtained was molded by means of a 5 oz. screw in-line type injection molding machine at an injection pressure of 800 kg./cm.² The lowest resin temperature at which the mold can be loaded was determined. The molded specimens were tested for melt flow rate, Vicat softening point, and Izod impact strength. The results obtained are as shown in Table 2.

EXAMPLES 6 AND 7

The procedures as described in Examples 1 and 2 were repeated except that various compounds as shown in Table 3 were added to a modified polyphenylene oxide powder having an intrinsic viscosity of 0.70 dl./g. (as measured in chloroform at 25° C.) and containing 59.0% by weight of 2,6-dimethyl-1,4-phenylene oxide units and 41.0% by weight of styrene units. The results obtained are as shown in Table 3.

TABLE 3

| Example No. | Additive | | Milling torque of extrusion, kg.m. | Output rate of extrusion, g./hr. | Physical properties of compression molded sheets | | |
|---|---|---|---|---|---|---|---|
| | Compound | Amount, phr. | | | Melt flow rate, g./10 min. | Vicat softening point, °C. | Izod impact strength, kg. cm./cm. |
| 6.......... | N,N'-distearoyl ethylene diamine..... | 1 | 2,450 | 968 | 1.01 | 149.0 | 4.4 |
| 7.......... | {N,N'-distearoyl ethylene diamine..... Zinc stearate........................... | 2 1 | 1,600 | 905 | 1.44 | 145.8 | 5.2 |
| Control.... | None.................................. | | 2,650 | 955 | 0.70 | 152.0 | 3.6 |

As is clear from the results of Examples 1 to 7, the processability of the modified polyphenylene oxide is improved by adding additives as those used in the present invention with or without using a rubbery polymer when modified polyphenylene oxide is prepared.

That is, there is no difference in the effect for the improvement of processability of modified polyphenylene oxide by adding additives between in cases of modified polyphenylene oxide containing a rubbery polymer and that containing no rubbery polymer without varying the characteristics of the modified polyphenylene oxide composition by the presence or absence of rubbery polymers.

What is claimed is:

1. A modified polyphenylene oxide composition comprising a modified polyphenylene oxide which is obtained by polymerizing at least one unsubstituted or substituted styrene compound in the presence of a polyphenylene oxide and an additive selected from the group consisting of a fatty acid bisamide having the general formula:

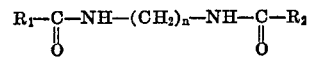

wherein $R_1$ and $R_2$ each is an aliphatic hydrocarbon radical having 11 to 21 carbon atoms and $n$ is an integer of from 1 to 4, and a mixture of the fatty acid bisamide

TABLE 2

| Example No. | Additive | | Minimum resin temperature for injection molding, °C. | Physical properties of injection molded sheet | | |
|---|---|---|---|---|---|---|
| | Compound | Amount, phr. | | Melt flow rate, g/10 min. | Vicat softening point, °C. | Izod impact strength, kg. cm./cm. |
| 3......... | {N,N'-distearoyl ethylene diamine............ Zinc stearate............................. Carbon black HAF........................ | 2 1 1 | 278 | 2.60 | 146.3 | 12.5 |
| 4......... | {N,N'-distearoyl ethylene diamine............ Zinc stearate............................. 2,2'-methylene-bis-(6-tert-butyl-4-methylphenol).... Distearyl thiodipropionate................ Carbon black HAF........................ | 3 1 0.5 0.5 1 | 272 | 2.87 | 145.6 | 15.0 |
| 5......... | {N,N'-distearoyl ethylene diamine............ Zinc stearate............................. 2,2'-methylene-bis(6-tert-butyl-4-methylphenol).... Distearyl thiodipropionate................ Carbon black HAF........................ | 5 1 0.25 0.25 1 | 263 | 4.09 | 144.8 | 17.5 |
| Control... | None................................... | | 293 | 1.27 | 156.7 | 5.21 | and a metallic salt of a fatty acid having the general formula:

$$(RCOO)_nM$$

wherein R is an aliphatic hydrocarbon radical having 11 to 21 carbon atoms, M is a metallic ion selected from the group consisting of Ca, Mg, Ba, Zn and Pb, and $n$ is an integer corresponding to the valency of each of said metallic ions, the fatty acid bisamide being present in an amount of 0.1% to 10% by weight and the metallic salt of the fatty acid being present in an amount of 0.1% to 5% by weight based on the weight of the modified polyphenylene oxide.

2. A modified polyphenylene oxide composition according to claim 1, wherein the unsubstituted or substituted styrene compound is a member selected from the group consisting of styrene, 2,4-dichlorostyrene, p-methoxystyrene, p-nitrostyrene, p-methylstyrene, p-phenylstyrene, p-acetoxystyrene, p-aminostyrene, p-chlorostyrene, o-hydroxystyrene, p-hydroxystyrene, divinylstyrene, α-methylsytrene and p-methoxy-α-methylstyrene.

3. A modified polyphenylene oxide composition according to claim 1, wherein the polyphenylene oxide is a member selected from the group consisting of poly-2,6-dimethyl-1,4-phenylene oxide, poly-2,6-diethyl-1,4-phenylene oxide, poly-2,6-dipropyl-1,4-phenylene oxide, poly-2,6-dimethoxy - 1,4 - phenylene oxide, poly-2,6-dichloromethyl-1,4-phenylene oxide, poly-2,6-dibromomethyl-1,4-phenylene oxide, poly-2,6-ditolyl - 1,4 - phenylene oxide, poly-2,6-dichloro - 1,4 - phenylene oxide and poly-2,5-dimethyl-1,4-phenylene oxide.

4. A modified polyphenylene oxide composition according to claim 1, wherein the fatty acid bisamide is a member selected from the group consisting of methylenebisamides, and ethylenebisamides of lauric acid, tridecanoic acid, myristic acid, palmitic acid, margaric acid, stearic acid, nonadecanoic acid, arachic acid, behenic acid, arachidonic acid, oleic acid, linolenic acid, parinaric acid, petroselic acid, vaccenic acid, elaidic acid, gadoleic acid, erucic acid, linolic acid and linoelaidic acid.

5. A modified polyphenylene oxide composition according to claim 1, wherein the metallic salt of a fatty acid is a member selected from the group consisting of Ca, Mg, Ba, Zn and Pb salt of lauric acid, tridecanoic acid, myristic acid, palmitic acid, margaric acid, stearic acid, nonadecanoic acid, arachic acid, behenic acid, arachidonic acid, oleic acid, linolenic acid, parinaric acid, petroselic acid, vaccenic acid, elaidic acid, gadoleic acid, erucic acid, linolic acid and linoelaidic acid.

6. A modified polyphenylene oxide composition comprising a modified polyphenylene oxide which is obtained by polymerizing at least one unsubstituted or substituted styrene compound in the presence of a polyphenylene oxide with a rubbery polymer and an additive selected from the group consisting of a fatty acid bisamide having the general formula:

$$R_1-\underset{\underset{O}{\|}}{C}-NH-(CH_2)_n-NH-\underset{\underset{O}{\|}}{C}-R_2$$

wherein $R_1$ and $R_2$ each is an aliphatic hydrocarbon radical having 11 to 21 carbon atoms and $n$ is an integer of from 1 to 4, and a mixture of the fatty acid bisamide and a metallic salt of a fatty acid having the general formula:

$$(RCOO)_nM$$

wherein R is an aliphatic hydrocarbon radical having 11 to 21 carbon atoms, M is a metallic ion selected from the group consisting of Ca, Mg, Ba, Zn and Pb, and $n$ is an integer corresponding to the valency of each of said metallic ions, the fatty acid bisamide being present in an amount of 0.1% to 10% by weight and the metallic salt of the fatty acid being present in an amount of 0.1% to 5% by weight based on the weight of the modified polyphenylene oxide.

7. A modified polyphenylene oxide composition according to claim 6, wherein the unsubstituted or substituted styrene compound is a member selected from the group consisting of styrene, 2,4-dichlorostyrene, p-methoxystyrene, p-nitrostyrene, p-methylstyrene, p-phenylstyrene, p-acetoxystyrene, p - aminostyrene, p - chlorostyrene, o-hydroxystyrene, p-hydroxystyrene, divinylstyrene, α-methylstyrene and p-methoxy-α-methylstyrene.

8. A modified polyphenylene oxide composition according to claim 6, wherein the polyphenylene oxide is a member selected from the group consisting of poly-2,6-dimethyl-1,4-phenylene oxide, poly-2,6-diethyl-1,4-phenylene oxide, poly-2,6-dipropyl - 1,4 - phenylene oxide, poly-2,6-dimethoxy - 1,4 - phenylene oxide, poly-2,6-dichloromethyl-1,4-phenylene oxide, poly-2,6-dibromomethyl-1,4-phenylene oxide, poly-2,6-ditolyl - 1,4 - phenylene oxide, poly-2,6-dichloro - 1,4 - phenylene oxide and poly-2,5-dimethyl-1,4-phenylene oxide.

9. A modified polyphenylene oxide composition according to claim 6, wherein the rubbery polymer is a member selected from the group consisting of polybutadiene, polyisoprene, polychloroprene, butadiene-styrene copolymer, butadiene-styrene block copolymer, polybutadiene-styrene graft copolymer, polyisoprene-styrene graft copolymer, isoprene-styrene copolymer, polybutadiene-acrylonitrile-styrene graft copolymer, butadiene-acrylonitrile copolymer, polybutadiene-styrene - α - methyl-styrene graft copolymer, polybutadiene-styrene-methyl methacrylate graft copolymer, poly(butadiene - styrene)-styrene graft copolymer, poly(butadiene - styrene) - acrylonitrile graft copolymer, polychloroprene-styrene graft copolymer and poly(butadiene-acrylonitrile)-styrene graft copolymer.

10. A modified polyphenylene oxide composition according to claim 6, wherein the fatty acid bisamide is a member selected from the group consisting of methylenebisamides, and ethylenebisamides of lauric acid, tridecanoic acid, myristic acid, palmitic acid, margaric acid, stearic acid, nonadecanoic acid, arachic acid, behenic acid, arachidonic acid, oleic acid, linolenic acid, parinaric acid, petroselic acid, vaccenic acid, elaidic acid, gadoleic acid, erucic acid, linolic acid and linoelaidic acid.

11. A modified polyphenylene oxide composition according to claim 6, wherein the metallic salt of a fatty acid is a member selected from the group consisting of Ca, Mg, Ba, Zn and Pb salts of lauric acid, tridecanoic acid, myristic acid, palmitic acid, margaric acid, stearic acid, nonadecanoic acid, arachic acid, behenic acid, arachidonic acid, oleic acid, linolenic acid, parinaric acid, petroselic acid, vaccenic acid, elaidic acid, gadoleic acid, erucic acid, linolic acid and linoelaidic acid.

References Cited

UNITED STATES PATENTS

| | | | |
|---|---|---|---|
| 3,487,127 | 12/1969 | Erchak et al. | 260—47 X |
| 2,779,744 | 1/1957 | Groff et al. | 260—23 X |
| 3,385,804 | 5/1968 | Hill, Jr. | 260—23 X |
| 3,522,236 | 7/1970 | Bostick et al. | 260—47 X |

OTHER REFERENCES

SPE Journal, October 1965, p. 1153 (advertisement).
Schildknecht, "Polymer Processes," pp. 328, 329 (1956). (1956).

DONALD E. CZAJA, Primary Examiner

E. C. RZUCIDLO, Assistant Examiner

U.S. Cl. X.R.

260—18 R, 18 N, 32.6 R, 47 ET, 874